C. P. ELLIS.
Twine-Cutter.
No. 159,168.
Patented Jan. 26, 1875.
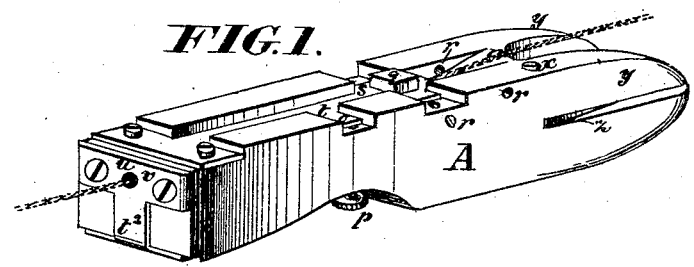
FIG. 1.
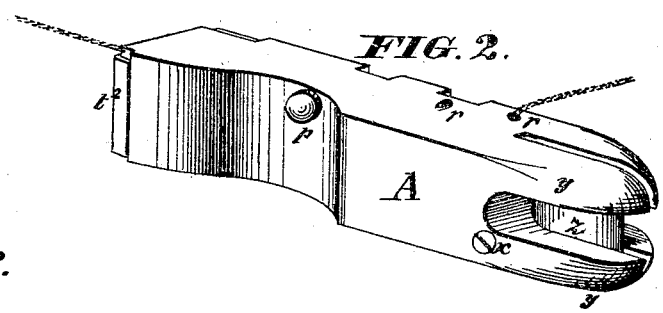
FIG. 2.
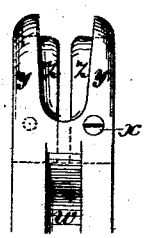
FIG. 8.
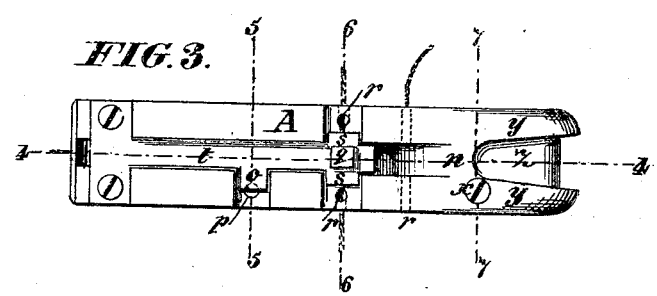
FIG. 3.
FIG. 4.
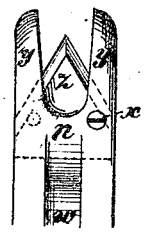
FIG. 9.
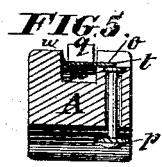
FIG. 5.
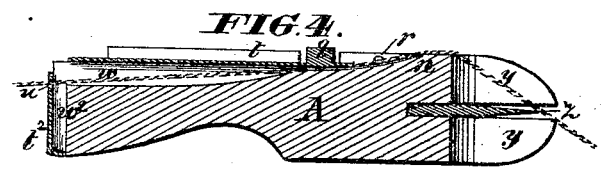
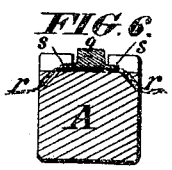
FIG. 6.
FIG. 7.
WITNESSES
Jas. L. Ewin
Henry Tanner.
INVENTOR
Charles P. Ellis
By Knight Bros. Attorneys

UNITED STATES PATENT OFFICE.

CHARLES P. ELLIS, OF PARKER CITY, PENNSYLVANIA.

IMPROVEMENT IN TWINE-CUTTERS.

Specification forming part of Letters Patent No. 159,168, dated January 26, 1875; application filed November 16, 1874.

CASE B.

*To all whom it may concern:*

Be it known that I, CHARLES P. ELLIS, of Parker City, in the county of Armstrong and State of Pennsylvania, have invented a new and useful Improvement in Twine-Cutters, of which the following is a specification:

This invention relates to twine-cutters of a convenient form, which are designed to be applied to the twine and to remain attached thereto, and to be used in applying the twine as well as in severing it, the cutter being grasped in the hand while in use.

The present invention consists, primarily, in a simple and cheap form of attached twine-cutter, having a stock which is adapted to be made in one piece, and without wings or other projections. The twine passage is formed by a groove in one side of the stock, and the knife or knives are inclosed by guards at one end of the stock and in line therewith.

The invention consists, secondly, in arranging the tension-spring, or the effective portion thereof, within the twine-groove, so as to retain the twine therein while it bears on the twine with sufficient force to constitute a holding tension.

The invention consists, thirdly, in producing this exposed tension-spring with a thumb-piece by which to apply additional pressure for tightening the twine in wrapping.

The invention consists, fourthly, in a prominence or projection in the line of the twine-groove, and at proper distance from the cutting-point, to insure leaving a catch end of sufficient length, and to facilitate grasping the latter.

The invention consists, fifthly, in a transverse lifter, adapted to be operated by the finger for elevating the tension-spring to release the twine and to facilitate threading the cutter.

In the accompanying drawing, Figure 1 is a perspective view of a twine-cutter illustrating this invention. Fig. 2 is a perspective view of the same in different position. Fig. 3 is a plan view of the same. Fig. 4 is a longitudinal section on the line 4 4, Fig. 3. Figs. 5, 6, and 7 are transverse sections on the lines correspondingly numbered in Fig. 3. Figs. 8 and 9 are partial plan views illustrating the employment of knives of different forms.

Like letters of reference indicate corresponding parts in the several figures.

This twine-cutter has a stock, A, adapted in size and form to be grasped in the hand.

The stock may be made of any suitable material, and of any preferred shape. It is adapted to be made in one part, and is solid, except as hereinafter specified.

One end of the stock A is recessed to receive the knife or knives $z$, and to expose the same, but not so that the fingers may come in contact therewith. The extended sides of the stock form guards $y$.

In the preferred form of the knife illustrated in Figs. 1 to 7 it is single, and has a straight transverse edge beveled from both sides, as clearly represented in Figs. 3 and 4, and is secured in place by a pair of screws, $x$, introduced from opposite sides, as shown in Fig. 7. The shape of the knife, and the mode of attaching the same are not, however, essential.

Inferior modifications of the former are illustrated in Figs. 8 and 9. In the first modification, a pair of knives, $z$, each having two cutting-edges, are employed; and in the second modification, a single triangular knife, presenting two oblique cutting-edges, is adopted.

In what may be termed the top of the stock A a longitudinal groove or depression, $w$, is formed, and a plate, $v$, applied to the rear end of the stock, is provided with an aperture, $u$, for the reception of the twine. Within the groove $w$ the blade of a tension-spring, $t$, is arranged, and this adapted to press on the twine at its extremity, and is adapted also to retain the twine within the groove $w$, while the latter protects the tension-spring from injury. A pair of lateral projections, $s$, occupying corresponding recesses in the stock at the extremity of the tension-spring, serve, by preference, to preclude any displacement of the twine by extending beyond the sides of the twine-passage, as shown in cross-section at Fig. 6. A number of perforations, $r$, are provided in the stock for regulating the tension, or for employment alone as the tension device, if preferred. The tension thus afforded, in either case, is what I have termed a "holding tension," and is designed to be sufficient to retain the cutter on the twine, and to hold the latter during the cutting operation.

For applying additional pressure to the twine, so as to hold it more tightly, as at the end of the operation of wrapping a parcel, a thumb-piece, $q$, is applied to the effective end of the tension-spring $t$.

To ease the tension during the wrapping of a parcel, or to elevate the spring to facilitate threading the cutter, a lifter, $p$, is employed, the same having a head, which, by preference, is arranged in a recess in the bottom of the stock, so as to operate by the finger of the hand in which the cutter is held. In the illustration the upper end of this lifter is headed or flanged, to prevent its displacement, and engages with a lateral projection, $o$, on the tension-spring within a corresponding recess in the stock, as represented in cross-section at Fig. 5.

To insure leaving a proper catch-end of twine, and to facilitate grasping the same when the twine is threaded in the preferred way, illustrated in Figs. 1 and 4, an elevation or projection, $n$, is formed at a proper point in line with the longitudinal groove $w$, as clearly shown in said figures.

In the illustration a supplemental twine-passage, $w^2$, is formed by a groove in the rear end of the stock A, and the end plate $v$, hereinbefore referred to, is extended to form a substitute tension-spring, $t^2$, which operates, in the same manner as the main tension-spring, to produce a holding tension when it is employed.

This twine-cutter, in the preferred form in which it is illustrated and described, is adapted to be threaded in a variety of ways. In a preferred mode of threading the cutter, illustrated in Figs. 1 and 4, the twine passes through the entrance-aperture $u$, throughout the groove $w$, beneath the extremity of the tension-spring $t$, and over the projection $n$ to the knife.

Another preferred mode of threading is to pass the twine through the aperture or eye $u$ and groove $w$, and beneath the tension-spring $t$, and then through any one or more of the perforations $r$, as illustrated in Figs. 2 and 3.

Another way is to pass the thread transversely beneath the head of the tension-spring $t$, and through one or both of the perforations in line therewith, as illustrated in Figs. 3 and 6.

Another way is to pass the twine through the eye $u$ and end groove $w^2$, and beneath the extremity of the tension-spring $t^2$.

Other modifications of the way of threading will be apparent.

To use the cutter, it is grasped in one hand; the twine end is caught by the other hand, and the twine is carried around the parcel by means of the cutter, the tension-spring being elevated, to allow the twine to run freely, if desired, by means of the lifter $p$. To tighten the twine, the thumb is applied to the thumb-piece $q$ on the tension-spring. To cut the twine, it is brought in contact with the edge of the knife, or with one of the edges of the knife or knives. The twine is thus severed, and at the same time a sufficient catch end is left for use at the next operation.

The present invention is additional to that for which Letters Patent of the United States No. 156,553 were issued to me November 3, 1874; and all that is shown and described in said patent is hereby disclaimed, as forming no part of the present invention.

The following is claimed as new, namely:

1. The attached twine-cutter herein specified, having a solid stock, A, constructed with knife-guards $y\ y$ at one end, and a longitudinal groove in one side or face to constitute the twine-passage, substantially as herein shown and described, for the purpose specified.

2. The combination of the entrance-aperture or eye $u$, the longitudinal groove $w$, and the tension-spring $t$, arranged within the latter, for guiding and holding the twine, in the manner set forth.

3. The tension-spring $t$, having a thumb-piece, $q$, by which to apply additional pressure, in combination with the stock A, having a knife or knives, $z$, in one end, substantially as shown and described.

4. The elevation or projection $n$, in combination with the longitudinal twine-groove $w$, tension-spring $t$, and knife or knives $z$, arranged as herein described, for the purpose set forth.

5. The lifter $p$, arranged transversely of the stock, and operating to release the twine at will, in combination with the longitudinal tension-spring $t$, applied externally, as herein specified.

CHARLES P. ELLIS.

Witnesses:
JAMES P. COTTER,
D. C. BRAWLEY.